April 21, 1953      T. B. CHACE      2,635,624
LIQUID CONTROL MECHANISM
Original Filed Nov. 13, 1945
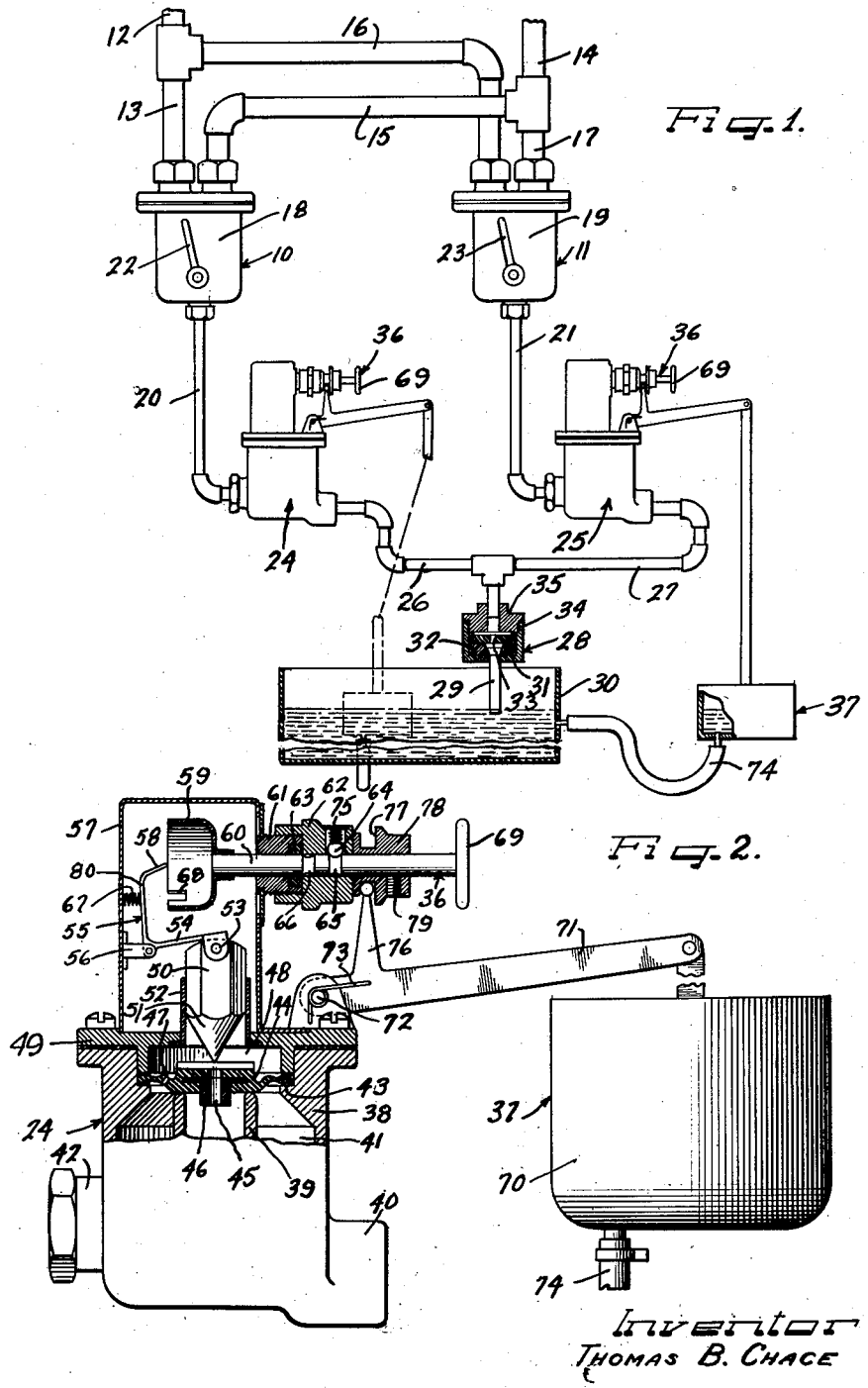
Inventor
THOMAS B. CHACE
by The Firm of Charles W. Hills Attys.

Patented Apr. 21, 1953

2,635,624

UNITED STATES PATENT OFFICE 2,635,624

LIQUID CONTROL MECHANISM

Thomas B. Chace, Winnetka, Ill., assignor to The Dole Valve Company, Chicago, Ill., a corporation of Illinois Original application November 13, 1945, Serial No. 627,983. Divided and this application August 2, 1947, Serial No. 765,694

4 Claims. (Cl. 137—390)

1

This invention relates to a liquid control mechanism, and more particularly, to a pilot-operated diaphragm shut-off valve and its associated operating and control mechanism.

This application is a division of my copending application for "Fluid Control System," U. S. Serial No. 627,983, filed November 13, 1945, now Patent No. 2,528,423 dated October 31, 1950 and assigned to the same assignee as the present invention.

While the liquid control mechanism of the present invention may be employed in a wide variety of fluid control systems, it is particularly adapted and suited for use on non-automatic and semi-automatic domestic washing machines of the type which do not have mechanism for stopping and starting the machine, filling the tub and emptying the water and centrifugally drying the clothes.

In this class of domestic washing machines, the problem of handling the water has been a difficult one, and particularly, where it is desired to keep the cost of the machine relatively low, and yet have many of the advantages of a complete automatic domestic washing machine.

One of the principal features and objects of the present invention is to provide a liquid control mechanism whose action is initiated in one manner and discontinued in a different manner.

A further object of the present invention is to provide a novel pilot-operated diaphragm shut-off valve.

Another object of the present invention is to provide novel actuating mechanism for the pilot of a diaphragm shut-off valve.

A further object of the present invention is to provide a novel combination shut-off valve and liquid level responsive member.

Another and still further object of the present invention is to provide a novel method and means for controlling the flow of liquid to a liquid receptacle.

The novel features which I believe to be characteristic of my invention are set forth with particularity in the appended claims. My invention itself, however, both as to its organization, method of operation and manner of construction, together with further objects and advantages thereof may best be understood by reference to the accompanying drawings, in which:

Figure 1 is a diagrammatic illustration of a liquid control system having liquid control mechanisms therein embodying the novel teachings of the present invention; and Figure 2 is an enlarged vertical view, partly in section, of one of the liquid control mechanisms shown in Figure 1 together with its associated liquid level responsive member.

In order to adequately understand the manner in which the liquid control mechanism of the present invention may be used, and in order to understand its functional operation, reference will first be made to a liquid control system employing a pair of liquid control mechanisms embodying the teachings and principles of the present invention. More particularly, and referring to Figure 1 of the drawing, there is illustrated therein an automatic temperature control mixer valve 10 and a second automatic temperature control mixer valve 11. These two mixer valves provide a dual mixer valve unit, and while they may be contained within a single housing if desired they have been illustrated as separate units in the diagrammatic illustration in order to emphasize their distinctive functions.

The automatic temperature controlled mixer valve 10 is connected to a hot liquid inlet duct 12 through a pipe 13 and is connected to the cold liquid supply duct 14 through a pipe 15. The automatic temperature controlled mixer valve 11 is connected to the hot liquid supply duct 12 through a pipe 16 and to the cold liquid supply duct 14 through a pipe 17.

The automatic temperature controlled mixer valves 10 and 11 may be of any conventional design having a temperature responsive means therein for automatically proportioning liquid of normally different temperatures to maintain the resulting mixed liquid at a predetermined temperature level. The liquid, such, for example, as water, is mixed within the housings 18 and 19 of the devices 10 and 11, respectively, and is delivered through mixed liquid delivery pipes 20 and 21.

The automatic temperature controlled mixer valves 10 and 11 are preferably provided with temperature adjusting members 22 and 23, respectively, for changing the temperature setting of the temperature responsive means contained within the housings 18 and 19, respectively, to maintain the mixed liquids at any of a number of different predetermined temperature levels. As will be presently understood, the temperature adjusting member 22 will be set to deliver mixed fluid at a different temperature level from that determined by the temperature adjusting member 23 of the mixer valve 11.

The mixed liquid delivery pipes 20 and 21 are connected, respectively, to the shut-off valves 24 and 25, and thence through delivery pipes 26 and 27, respectively, to an automatic constant rate of flow maintaining device 28. The downstream side of the flow control device 28 is connected to a delivery pipe 29 which opens into the tub or container 30 to which the fluid is to be delivered.

Before taking up the structure of the shut-off valves 24 and 25, it may be stated that the automatic constant rate of flow maintaining device 28 may be of any suitable design but has been illustrated as being of the design described and claimed in the copending application of Leslie A. Kempton, U. S. Serial No. 545,312, filed July 17, 1944, and now Patent No. 2,454,929, and assigned to the same assignee as the present invention. In substance, this constant rate of flow maintaining device includes a resilient diaphragm member 31 seated on a shoulder member 32 and having a central orifice 33 which is smaller than the opening provided by the shoulder member 32. As the pressure of the liquid against the upper side of the resilient member 31 increases, the washer or resilient member 31 is deflected downwardly, causing a smaller and smaller restriction in the upper end of the orifice 33. It has been found in practice that a construction of the type diagrammatically illustrated herein will maintain a substantially constant rate of liquid flow in the outlet irrespective of very wide variations in fluid pressure (such, for example, as variations of 15 pounds per square inch to 150 pounds per square inch).

The seat member having the shoulder member 32 on the resilient washer or diaphragm member 31 may be housed in any suitable container, and for diagrammatic purposes has been illustrated merely as a simple housing 34 having a removable cover plate 35 in the upper portion thereof.

The shut-off valves 24 and 25 are both alike and only one will be described in detail. More specifically, one of the two shut-off valves 24 and 25 is illustrated in Figure 2 of the drawings, namely, the shut-off valve 24.

The shut-off valve 24 includes manually operable mechanism 36 for opening the valve and a liquid level responsive member such, for example, as a cup or other liquid weight operated mechanism 37 for shutting off the valve to interrupt the flow of fluid from the pipe 20 to the delivery pipes 26 and 29 as water flows into said cup from the tub or container 30, as water in said container reaches a predetermined level. As shown in Figure 2 of the drawings, the shut-off valve 24 is of the pilot-operated diaphragm type and includes a casing or housing 38 in which is disposed a central sleeve or post 39. The sleeve or post 39 communicates directly with the outlet 40 of the casing 38, while the chamber 41 surrounding the post 39 communicates directly with the inlet 42 of the casing 38. A shoulder 43 is provided on the inner wall of the casing 38 opposite the upper end of the hollow central post 39. Upon this shoulder 43 is seated a resilient diaphragm 44 which closes the upper end of the chamber 41 and is also disposed to be seated on the upper end of the central post 39.

The diaphragm 44 has a central aperture or orifice 45 therein which is reinforced by an eyelet or collar 46. The diaphragm is also provided with one or more small openings 47, which are located radially outwardly of the central post 39 and arranged to communicate the chamber 41 with the chamber 48 and the upper side of the diaphragm 44. This chamber 48 is formed by the cooperation of a top plate 49 with the main housing member 38.

The size of the opening 47, or, in the case of more than one opening, the total combined area of the openings 47, is less than the cross-sectional area of the opening 45. When the orifice 45 is open, the liquid which has previously entered the upper chamber 48 through the opening 47 will escape more rapidly through opening 45 than it can through opening 47. This creates a greater pressure on the underside of the diaphragm 44 than on the upper side. The liquid itself thus actuates the diaphragm to lift it off of the central post 39 and liquid thereafter flows freely from the inlet 42 to the outlet 40. This will continue until the opening 45 is closed. At that time liquid from the inlet 42 under pressure will gradually work through the opening or openings 47 into the upper chamber 48. Since the liquid acting over the entire upper surface of the diaphragm 44 acts over a greater area than the liquid acting against the annular portion between the center post 39 and the side wall of the casing 38 where the diaphragm 44 is gripped, the diaphragm will be moved by the liquid pressure itself down against the center post 39. This shuts off the flow of liquid from the inlet 42 to the outlet 40.

The means by which the opening 45 in the diaphragm 44 is closed will now be described. A pilot 50 having a tapered lower end 51 is slidably mounted in an upstanding sleeve member 52. The tapered end 51 is arranged to engage the diaphragm 44 to close the opening 45 when in its lower position. A mechanism is also provided to raise the pilot 50 so as to free the tapered end 51 from the upper end of the opening 45. To this end, the pilot 50 is hinged as at 53 to the outer end of the lower arm 54 of an L-shaped member 55 or bell crank. The L-shaped member 55 is pivotally mounted on a bracket 56 carried on an upper housing member 57 which makes a liquid-tight connection with the top plate 49 of the housing member 38. The L-shaped member 55 also includes an upper arm portion 80 having an inwardly bent tongue 58 which bears against a cup-shaped cam member 59 mounted on a shaft 60. The shaft 60 is supported in a bearing member 61 carried on the housing 57 and also extends through a sleeve 62 carried on the bearing 61. An O-ring seal 63 is carried by the bearing member 61 around the shaft 60 to prevent leakage of liquid from within the shell 57 along the shaft 60.

The sleeve 62 contains a spring-pressed ball member 64 which is arranged to normally hold the shaft 60 in one of two positions. The two positions are determined by annular grooves 65 and 66 formed in the shaft 60. The location of the grooves 65 and 66 is such that when the groove 65 is in engagement with the ball member 64 the cup-shaped member 59 is in the position as shown in Figure 2 of the drawings. This means that the cup-shaped member 59 has engaged the tongue portion 58 to raise the pilot 50 and open the central opening 45 in the diaphragm 44.

As shown in Figure 2 of the drawings, the various parts are in their positions at just an instant after the pilot 50 has been raised, but prior to the time when the liquid in the upper chamber 48 has been bled through the central opening 45. This dumping of the liquid, however, in the upper chamber 48 takes place in a very short interval of time so that the action of the liquid in the inlet chamber 41 against the diaphragm 44 to raise the same is almost instantaneous.

When the shaft 60 is in its retracted position so that the groove 66 is in engagement with the ball 64, the cup-shaped member 59 has been moved out of engagement with the tongue portion 58, thus enabling the biasing spring 67 to return the pilot 50 to engagement with the diaphragm 44 and close the opening 45.

The cup 59 is also provided with a cut-out 68 which enables closure of the pilot 50 by rotation of the shaft 60 rather than by axial movement of the same. More particularly, the shaft 60 may be left in its axial position, as shown in Figure 2 of the drawings, with the groove 65 in engagement with the ball 64. The pilot 50 may then be closed by simply rotating the shaft 60 until the follower 58 falls into the notch 68. The handle or knob 69 is provided on the end of the shaft 60 for either rotating the shaft or moving the same axially.

The particular liquid level responsive member illustrated in Figures 1 and 2 of the drawings is of the so-called weight operated type. It is to be understood, however, that throughout the specification and claims that the term "liquid level responsive member" is used in its broad sense.

In the weight operated type of liquid level responsive member as illustrated in Figures 1 and 2 of the drawings, the member is in the form of a cup 70 which is pivotally supported on an arm 71, hinged as at 72, and normally biased to its upper position by a spring 73. A hose connection 74 communicates with the cup member 70 and the tub 30. The bottom of the cup member 70 is beneath the upper level of the tub 30 and when liquid in the tub has risen to a height sufficient to cause water to flow into the cup 70, the weight of the water in the cup 70 causes the arm 71 to drop down from its position as shown in Figure 2 to a position where the groove 66 is in engagement with the ball 64. When the cup 70 has been filled with water, the pilot 50 closes the opening 45 of the diaphragm 44 and causes the shut-off valve 24 to be closed. When the water in the tub 30 is being drained therefrom liquid in the cup 70 will flow back into the tub 30, reducing the weight thereof and the spring 73 will return said cup to the uppermost position shown in Figure 2, effecting movement of the shaft 36 inwardly and thus opening the valve.

The biasing spring 75 which presses the ball 64 into engagement with the shaft 60 is of sufficient strength to prevent movement of the shaft 60 as long as the cup-shaped member 70 is empty. When the cup-shaped member 70 fills with water the weight overcomes the retaining action of the biasing spring 75 to cause movement of the shaft 60 to the right, as viewed in the drawings. This is effected by a finger portion 76 formed on the arm 71 which extends up into a deep recess 77 formed in a collar member 78 which is fixed on the shaft 60 by a set screw 79.

The above described system provides a complete unitary system for delivering water at a plurality of different selected temperatures to the tub 30. More particularly, it provides a simple and convenient way in which any one of several selected temperatures may be chosen for the washing machine by manually opening the appropriate valve or valves and the supply of liquid to the tub will automatically shut off all of the supply pipes when the tub has been filled with water, as indicated by the liquid level responsive member. For example, assume that the automatic temperature controlled mixer valve 10 is set for 170° and that the automatic temperature controlled mixer valve 11 is set for 130°. If now shut-off valve 24 is open while shut-off valve 25 remains closed, water is delivered to the tub 30 at 170° temperature, and this water supply will be shut off when the desired water level has been reached in the tub 30 as determined by the cup member 37, it being understood that the cup member 37 is disposed at a height dependent upon the height at which water is desired in the tub 30.

Suppose the water in the tub 30 is to be water at 150° temperature. Under such circumstances, both shut-off valve 24 and shut-off valve 25 are opened by manually pushing in on both knobs 69 and with each cup-shaped member 59 so positioned that the notch 68 does not lie opposite the tongue 58. This causes each of the pilots 50 to open, thereby effecting opening of each of the shut-off valves 24 and 25. The water now delivered to the tub 30 will be water having a temperature of 150°.

If the water to be used in the tub 30 is to be water relatively cooler, the valve 25 is opened by pushing in the control handle 69 of that valve thereby opening the valve 25, while at the same time leaving the valve 24 closed.

It will furthermore be understood from the above description that the liquid control mechanism is particularly advantageous in bringing about a successful operation of the above described system in an economical and efficient manner.

While I have shown a particular embodiment of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. A pilot controlled diaphragm shut-off valve comprising a valve port, a valve movable to open and close said port, a pilot for controlling the opening and closing of said valve, a pivotally mounted bell crank having a pair of arms, said pilot being linked to one of said arms, an elongated control shaft mounted for limited lengthwise movement and also for angular movement about its longitudinal axis, said shaft having a cup-shaped end portion facing the other of said arms and engageable therewith to rock said bell crank and lift said pilot to a valve opening position upon lengthwise movement of said control shaft in one direction, resilient means normally urging said pilot to a valve closing position, and fluid level responsive means for retracting said shaft to allow return of said pilot to a valve closing position, said cup-shaped end portion of said shaft having a notched portion therein movable into position to register with the other of said arms whereby said shaft may be angularly moved about its longitudinal axis to position the notched portion of said cup into registry with said other of said arms to thereby prevent movement of said pilot to a valve opening position by the shaft irrespective of the lengthwise position of said shaft.

2. In a pilot valve operating mechanism, a valve housing having a valve port therein, a valve for closing said port, a pilot movable between two predetermined positions to control the opening and closing of said valve, a bell crank pivotally mounted on said housing and having one lever arm operatively connected with said pilot and another lever arm extending at an angle with respect to said first mentioned lever arm, a rectilinearly movable control shaft mounted in said housing for rectilinear movement along the axis thereof and for angular movement about the axis thereof and having an enlarged end portion engageable with said other lever arm for rocking said arm to move said pilot to a valve opening position upon rectilinear movement of said shaft in one direction, and for allowing said lever arm to rock in a direction to allow said pilot to move into a valve closing position upon rectilinear movement of said shaft in an opposite direction, and said enlarged engaging end portion of said shaft having a recessed portion therein movable into position, upon angular movement of said shaft, to register with said other lever arm to prevent movement of said pilot to valve opening position upon rectilinear movement of said shaft in a valve opening direction.

3. A pilot valve operating mechanism comprising a valve housing, a valve port therein, a valve for closing said port, a pilot movable between two predetermined positions to control the opening and closing of said valve, lever means pivoted on said housing and connected with said pilot, an axially shiftable and rotatable member having engagement with said lever means for moving said pilot into its valve opening position, manually operable means for shifting said axially shiftable member about its axis to disengage said lever means and accommodate said pilot to move to a valve closing position, and a liquid level responsive member connected to said axially shiftable member to move said shiftable member in lengthwise direction to accommodate said pilot to move to its valve closing position upon a predetermined rise in the liquid level and to move said pilot to its valve opening position upon a predetermined drop in the liquid level.

4. A pilot valve operating mechanism comprising a valve housing having a valve port therein, a valve for closing said port, a pilot movable between two predetermined positions to control the opening and closing of said valve, lever means connected with said pilot for moving said pilot to a valve opening position, a longitudinally shiftable and rotatable control shaft engageable with said lever means to move said lever means and pilot to its valve opening position upon lengthwise movement of said control shaft in one direction, means for shifting said control shaft about its axis out of engagement with said lever means to accommodate said pilot to move to its valve closing position, and a pivotally supported liquid level responsive member operatively connected to said shaft to shift said shaft lengthwise to accommodate said pilot to move to its valve closing position upon a predetermined rise in the liquid level and to shift said shaft in an opposite direction to move said pilot to its valve opening position upon a predetermined drop in the liquid level.

THOMAS B. CHACE.

References Cited in the file of this patent

UNITED STATES PATENTS

| Number | Name | Date |
| --- | --- | --- |
| 487,305 | Van Aukin | Dec. 6, 1892 |
| 1,426,093 | Owens | Aug. 15, 1922 |
| 1,518,298 | Basel | Dec. 9, 1924 |
| 1,520,914 | Spearing | Dec. 30, 1924 |
| 1,610,397 | Thorpe | Dec. 14, 1926 |
| 1,709,678 | Miller | Apr. 16, 1929 |
| 1,742,973 | Schossow | Jan. 7, 1930 |
| 1,770,912 | Clapp | July 22, 1930 |
| 1,804,137 | Yates | May 5, 1931 |
| 2,305,151 | Fields | Dec. 15, 1942 |